United States Patent
Sampathkumar et al.

(10) Patent No.: US 12,052,290 B2
(45) Date of Patent: *Jul. 30, 2024

(54) ZERO-TRUST DYNAMIC DISCOVERY

(71) Applicant: Cisco Technology, Inc., San Jose, CA (US)

(72) Inventors: Saravanan Sampathkumar, San Jose, CA (US); Ajay K. Modi, San Jose, CA (US); Umamaheswararao Karyampudi, Fremont, CA (US); Kamal Bakshi, Livermore, CA (US); Yousuf H. Khan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/937,169

(22) Filed: Sep. 30, 2022

(65) Prior Publication Data

US 2023/0026570 A1 Jan. 26, 2023

Related U.S. Application Data

(63) Continuation of application No. 16/988,419, filed on Aug. 7, 2020, now Pat. No. 11,503,077.

(51) Int. Cl.
*H04L 67/55* (2022.01)
*G06F 8/65* (2018.01)
*G06F 16/28* (2019.01)
*H04L 9/40* (2022.01)

(52) U.S. Cl.
CPC ............... *H04L 63/20* (2013.01); *G06F 8/65* (2013.01); *G06F 16/285* (2019.01); *H04L 67/55* (2022.05)

(58) Field of Classification Search
None
See application file for complete search history.

(56) References Cited

U.S. PATENT DOCUMENTS

| | | | |
|---|---|---|---|
| 10,565,372 B1 * | 2/2020 | Stickle | G06F 21/55 |
| 2004/0107360 A1 * | 6/2004 | Herrmann | H04L 63/20 726/1 |
| 2007/0143851 A1 * | 6/2007 | Nicodemus | H04L 63/1433 726/4 |
| 2021/0281578 A1 * | 9/2021 | Olson | H04L 63/20 |

* cited by examiner

*Primary Examiner* — Cai Y Chen
(74) *Attorney, Agent, or Firm* — Patterson + Sheridan, LLP

(57) ABSTRACT

Zero-trust dynamic discovery in provided by identifying a plurality of endpoints, including targets and initiators, connected to a software defined network, wherein the targets are provided on the software defined network according to a network addressable memory standard that lacks a native discovery service; grouping the targets into a plurality of target groups and the initiators into a plurality of initiator groups; and in response to receiving a discovery request from a given initiator grouped in a given initiator group of the plurality of initiator groups, returning addressing information for a target group of the plurality of target groups associated with the given initiator group in a security policy configuration for the software defined network.

20 Claims, 5 Drawing Sheets

ZERO-TRUST DYNAMIC DISCOVERY

CROSS-REFERENCE TO RELATED APPLICATIONS

This application is a continuation of co-pending U.S. patent application Ser. No. 16/988,419 filed Aug. 7, 2020. The aforementioned related patent application is herein incorporated by reference in its entirety.

TECHNICAL FIELD

Embodiments presented in this disclosure generally relate to networking. More specifically, embodiments disclosed herein provide for the discovery and promulgation of security policies usable in software defined networks operating internet protocols such as TCP (Transmission Control Protocol) and RoCE (RDMA (Remote Direct Memory Access) over Converged Ethernet).

BACKGROUND

For computing devices on a shared access network to communicate with one another, those devices need to know how to address one another so that communications are correctly routed to the target and any responses (e.g., acknowledgements or replies) are routed to the correct initiator device. However, providing various devices with the address information for other devices on a network can lead to security concerns if some of the devices are not trusted or otherwise authorized to communication with one another. Accordingly, network administrators often restrict the flow of addressing information within the network.

Non-permitted communications may be dropped or ignored, quarantined, or flagged for administrative attention, whereas permitted communications are forwarded to the intended recipients (internal or external of the site). Tenants may assign various security policies for the various workloads running on the hosts, but the complexity of maintaining identical security policies across several sites increases as the number of sites increases.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
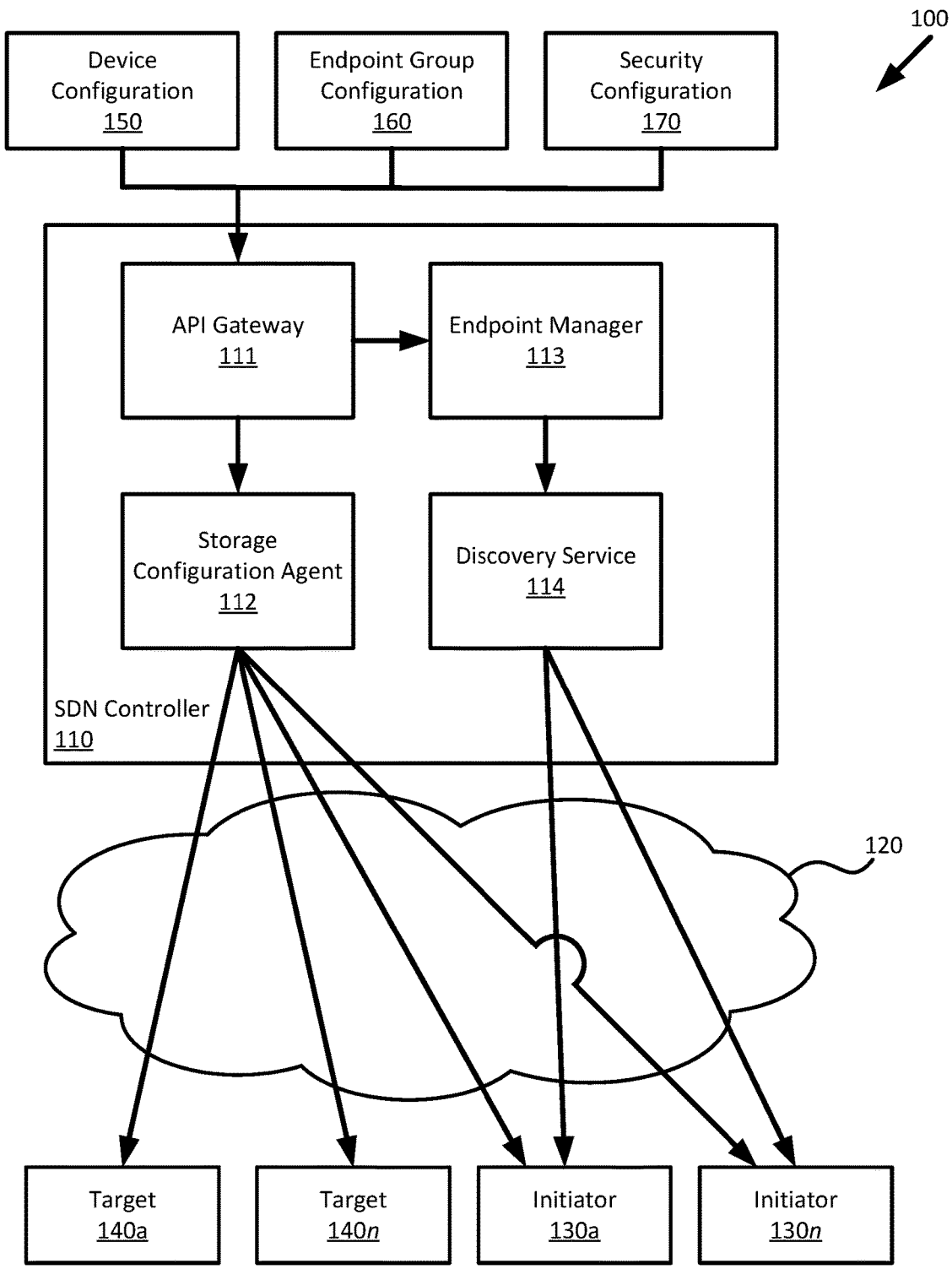
FIG. 1 illustrates a Software Defined Network environment, according to embodiments of the present disclosure.

One embodiment presented in this disclosure is a method comprising: identifying a plurality of endpoints, including targets and initiators, connected to a software defined network, wherein the targets are provided on the software defined network according to a network addressable memory standard that lacks a native discovery service; grouping the targets into a plurality of target groups and the initiators into a plurality of initiator groups; and in response to receiving a discovery request from a given initiator grouped in a given initiator group of the plurality of initiator groups, returning addressing information for a target group of the plurality of target groups associated with the given initiator group in a security policy configuration for the software defined network.

One embodiment presented in this disclosure is a system comprising: a processor; and a memory including instructions that when executed by the processor provide a discovery service in a software defined network, the discovery service configured to: identify a plurality of endpoints, including targets and initiators, connected to a software defined network, wherein the targets are provided on the software defined network according to a network addressable memory standard that lacks a native discovery service; group the targets into a plurality of target groups and the initiators into a plurality of initiator groups; and in response to receiving a discovery request from a given initiator grouped in a given initiator group of the plurality of initiator groups, return addressing information for a target group of the plurality of target groups associated with the given initiator group in a security policy configuration for the software defined network.

One embodiment presented in this disclosure is a storage device including computer readable instructions that when executed by a processor enable performance of an operation comprising: identifying a plurality of endpoints, including targets and initiators, connected to a software defined network, wherein the targets are provided on the software defined network according to a network addressable memory standard that lacks a native discovery service; grouping the targets into a plurality of target groups and the initiators into a plurality of initiator groups; and in response to receiving a discovery request from a given initiator grouped in a given initiator group of the plurality of initiator groups, returning addressing information for a target group of the plurality of target groups associated with the given initiator group in a security policy configuration for the software defined network.

Example Embodiments

The present disclosure provides for zero-trust dynamic discovery in SDNs (Software Defined Networks). Non-Volatile Memory Express over Fabrics (NVMe-oF) is one example of a standard that specifies how memory can be accessed over a network, and can be applied over a variety of transport mechanisms such as Fiber Channel, Infiniband, RoCE (RDMA (Remote Direct Memory Access) over Converged Ethernet) and TCP (Transmission Control Protocol). However, not all the transport mechanisms available under NVMe-oF and other networked memory standards have a dynamic discovery mechanism. For example, although NVMe-oF over Fiber Channel can use the fiber channel's generic services name server to provide dynamic discovery, NVMe-oF over RoCE and NVMe-OF over TCP do not have a dynamic discovery mechanisms and must rely on static configurations that are manually input by a system administrator. Stated differently, when used in an IP-based networking environment, NVMe-OF is a network addressable memory standard that lacks a native dynamic discovery service.

Accordingly, the present disclosure can be applied in networking environments in which dynamic discovery services are not natively provided under the networked memory standard (e.g., NVMe-oF) to enable the dynamic discovery of target devices so that initiator devices discover only those target devices permitted for the initiator devices to communicate with, and so that any additions/removals of target devices from the allowed sets are communicated to the appropriate initiator devices without requiring manual intervention. The present disclosure thereby provides greater scalability for network storage management in a datacenter environment that avoids the multicast storms inherent to pushing discovery information to a multicast group that includes all potential targets and initiators.

FIG. 1 illustrates an SDN environment 100, according to embodiments of the present disclosure. The SDN controller 110, which may be provided on a network switch or another computing device (such as those shown in FIGS. 4 and 5), hosts several services to control an SDN 120 to which various endpoint devices are connected. The endpoint devices are discussed herein as belonging to one of two categories; initiators 130 (individually, initiator 130a-n) and targets 140 (initially target 140a-n). In various embodiments, the SDN controller 110 is an existing controller that already manages an existing network, and runs the API gateway 111, storage configuration agent 112, endpoint manager 113m and discovery service 114 to provide the services and functionalities described in the present disclosure in addition to the original functionalities of the SDN controller 110 within the SDN.

An initiator 130 can be any computing device (such as those shown in FIG. 4) connected to the SDN 120 that is requesting data from, or for data to be stored to, memory defined by a target 140. The targets 140 can be any computing device (such as those shown in FIG. 4) that hosts storage on the SDN 120 that is accessible to the initiators 130. In various embodiments, the targets 140 can be dedicated storage devices, such as network addressable flash memory arrays, hard disk drive arrays, etc., but can also include initiator devices 130 (e.g., in a peer-to-peer storage arrangement). The configuration of the initiators 130 includes an IP address and an NQN (NVMe Qualified Name) and the configuration of the targets 140 includes values for various storage and network parameters including an IP address, NQN, a transport protocol (e.g., TCP, RoCEv1, RoCEv2), a layer four (L4) port, number of volumes, storage amounts per volume, etc.

The SDN controller 110 hosts several modules or agents that manage various functions within the SDN 120. The SDN controller 110 includes an API (Application Program Interface) gateway 111, a storage configuration agent 112, an endpoint manager 113, and a discovery service 114.

The API gateway 111 manages the configuration settings for the NVMe devices connected to and that are part of the SDN 120. In various embodiments, the API gateway 111 receives the configurations for the initiators 130 and targets 140 from an administrative user via the RESTful API or another API. The configurations can include one or more of a device configuration 150, an endpoint group configuration 160, and a security policy configuration 170. The API gateway 111 provides an interface to receive and manage the various configurations, and forwards the various configurations to the storage configuration agent 112 or the endpoint manager 113.

The storage configuration agent 112 provides a centralized storage management interface to provision resources and configure the targets 140 and initiators 130 as specified by an administrative user (e.g., via the device configuration 150).

The endpoint manager 113 works in tandem with the discovery service 114 to provide zero-trust dynamic discovery for storage resources in the SDN 120. The endpoint manager 113 uses the configurations received from the API gateway 111 to track all of the targets 140 and initiators 130 connected to the SDN 120, and ensure that the targets 140 and initiators 130 can communicate with one another according to the security policy configuration 170. The endpoint manager 113 enables administrative users to identify and group the targets 140 and initiators 130 that are connected to the SDN 120 according to the endpoint group configuration 160.

The endpoint group configuration 160 identifies which targets 140 are to be grouped together into an endpoint group, and which initiators 130 are to be grouped together into an endpoint group. In one embodiment, unless an initiator 130 or target 140 is part of an endpoint group, the given initiator/target is not permitted to communicate over the SDN 120 with other targets/initiators. The security policy configuration 170 identifies which endpoint groups (and the devices therein) are permitted to communicate with other endpoint groups (and the devices therein). The endpoint manager 113 provides changes to the security policy configuration 170 (and initial instantiation of the security policy configuration 170) to the discovery service 114 for provision to the initiators 130.

The discovery service 114 receives the endpoint group configurations 160 from the endpoint manager 113 to identify which initiators 130 and targets 140 are linked together or otherwise permitted to communicate with one another according to the security policy configuration 170. On receiving a discovery query from an initiator 130, such as via a DHCP (Dynamic Host Configuration Protocol) configuration at the initiator 130, the discovery service 114 identifies the endpoint group that the initiator 130 belongs to, and all of the endpoint groups that the initiator 130 is permitted to communicate with according to the security policy configuration 170. The discovery service 114 replies to the initiator 130 to provide the routing/addressing information for these reachable target endpoint groups to the requesting initiator 130. When the security policy configuration 170 is updated (e.g., adding a new target endpoint group, removing an existing target endpoint group, updating membership (adding or removing) of individual targets 140 in an existing target endpoint group), the discovery service 114 pushes the updates to any initiators 130 included in an affected initiator endpoint group.

Figure 2:
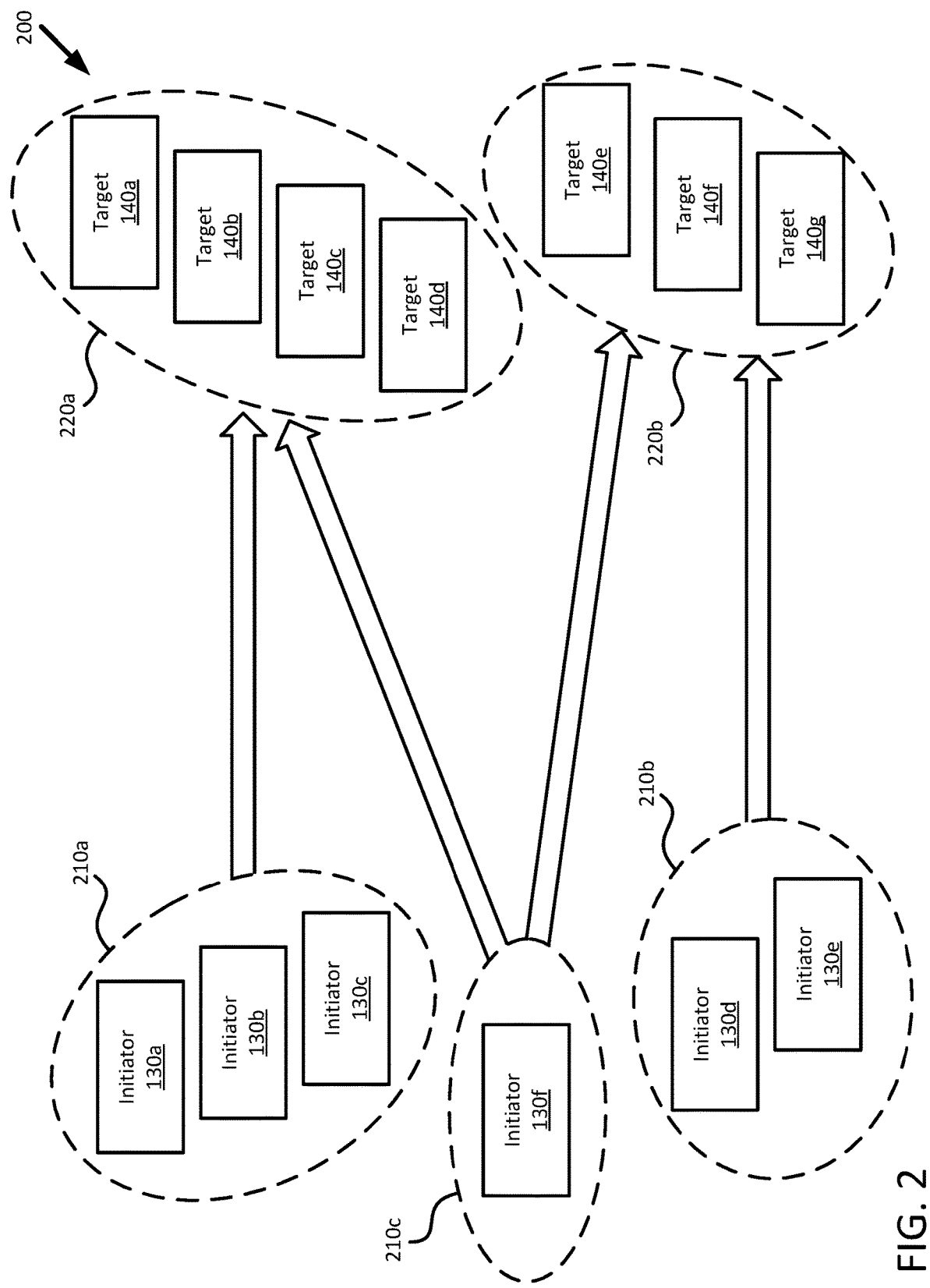
FIG. 2 illustrates a policy scenario, according to embodiments of the present disclosure.

FIG. 2 illustrates a policy scenario 200, according to embodiments of the present disclosure. In the policy scenario 200, five endpoint groups are shown: a first initiator group 210a (generally, initiator group 210), a second initiator group 210b, and a third initiator group 210c, as well as a first target group 220a (generally target group 220) and a second target group 220b. As illustrated in FIG. 2, the first initiator group 210a includes a first, second, and third initiator 130a-c, the second initiator group 210b includes a fourth and fifth initiator 130d-e, and the third initiator group 210c includes a sixth initiator 130f. The first target group 220a includes the first through fourth targets 140a-d, and the second target group 220b includes the fifth, sixth, and seventh targets 140e-g. As will be appreciated, other embodiments may include more or fewer initiators 130 and targets 140 which are grouped into more or fewer endpoint groups with various numbers of initiators 130 and targets 140 included therein.

The initiator groups 210 are endpoint groups that identify one or more initiators 130 that are grouped together according an endpoint group configuration 160, and the target groups 220 are endpoint groups that identify one or more targets 140 that are grouped together according to the endpoint group configuration 160.

For example, the devices used by a first department of a company can be included in the first initiator group 210a, devices used by a second department of a company can be included in the second initiator group 210b, and devices used by a third department of a company can be included in the third initiator group 210c. Similarly, storage devices reserved for the first department can be included in the first target group 220a and storage devices reserved for the second department can be included in the second target group 220b.

In the policy scenario 200 in this example, the third initiator group 210c includes the devices of a third department with supervisory authority over the first and second departments, and therefore has access to both the first and second target groups 220a-b. Accordingly, the first department's devices are dynamically provided with the addressing information needed access the networked storage associated with the first department, but are not provided with (and therefore cannot access) the addressing information for the networked storage for the second department. Similarly, the second department's devices are dynamically provided with the addressing information needed access the networked storage associated with the second department, but are not provided with (and therefore cannot access) the addressing information for the networked storage for the first department. The third department (e.g., an auditor department), in contrast, is provided with the addressing information for both the first and second departments' networked storage and can therefore access that storage.

In various embodiments, the security policy configuration 170 can specify various associations between a plurality of N initiator groups 210 and a plurality of M target groups 220 in which each individual initiator group 210 can be associated with any number from zero to M of the target groups 220, and each individual target group 220 can be associated with any number from zero to N of the initiator groups 210. Whenever the membership of a target group 220 is changed (e.g., by adding, removing, or renaming a target device), or the security policy configuration 170 updates which target groups 220 an initiator group 210 is permitted to access, only the affected initiator groups 210 are provided with the updated addressing information. Stated differently, instead of providing all N initiator groups 210 with updated addressing information whenever a change to the target groups 220 or security policy configuration 170 occurs, only those initiator groups 210 that are currently (or were previously) associated with an affected target group 220 are provided with the updated addressing information.

Figure 3:
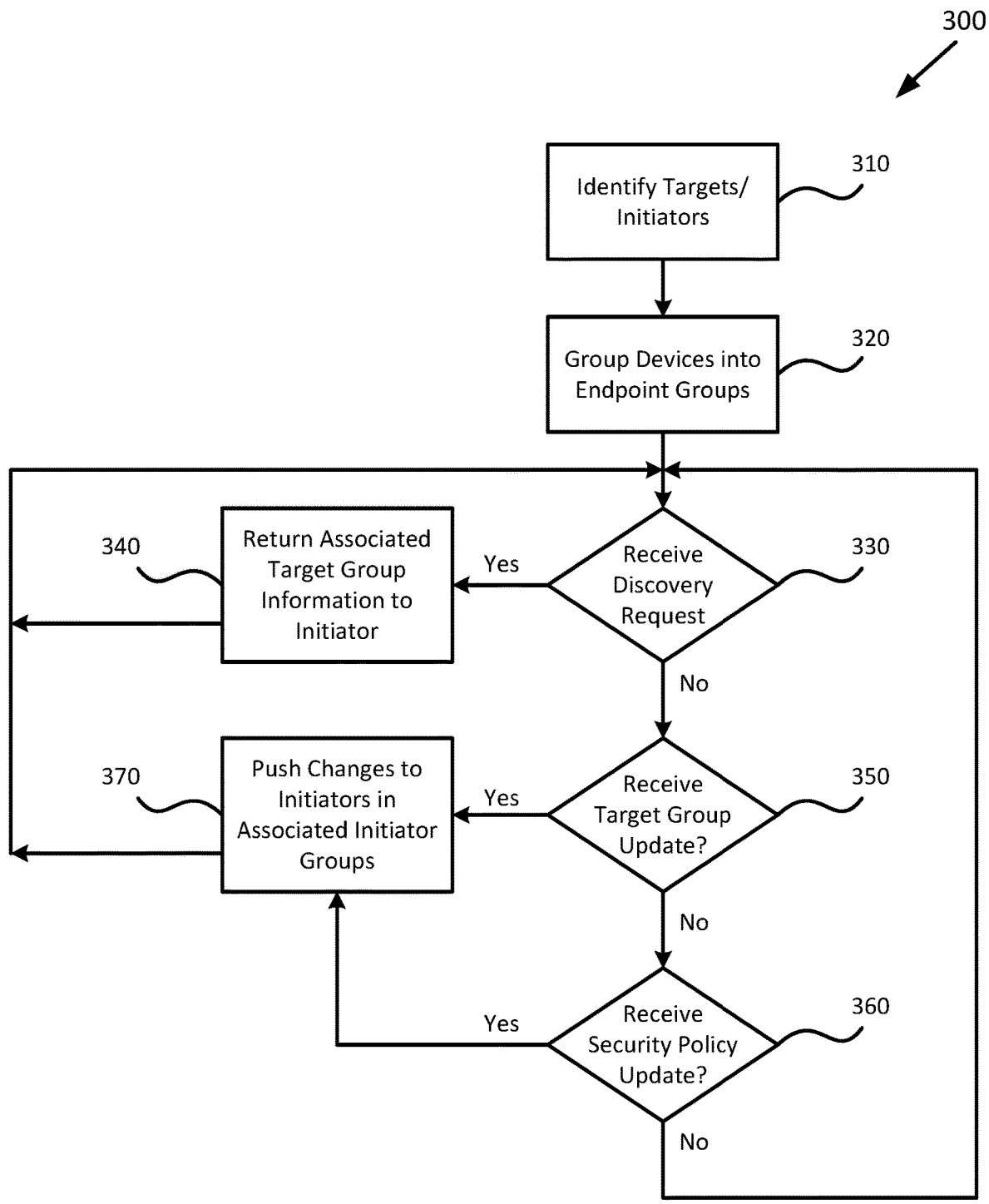
FIG. 3 is a flowchart for a method for zero-trust dynamic discovery, according to embodiments of the present disclosure.

FIG. 3 is a flowchart for a method 300 for zero-trust dynamic discovery, according to embodiments of the present disclosure. Method 300 leverages the functionalities of a network controller, such as the SDN controller 110, to manage the configuration and distribution of addressing information for various networked storage devices, such as the targets 140, provided on the network provided for the use of various groups of user devices, such as the initiators 130, according to a security policy configuration 170 that specifies groups of user devices that can access specified groups of networked storage devices. In various embodiments, method 300 is performed in conjunction with an SDN using an Internet Protocol (IP) based addressing schema, such as, TCP or RoCE, to provide networked memory storage devices (which can include hard disk drives, flash memory devices, or the like) via a networked memory storage specification, such as NVMe-oF, that does not natively support dynamic discovery of the networked memory storage devices.

Method 300 begins at block 310, where the network controller identifies the targets 140 and initiators 130 connected to the SDN managed by the network controller. In various embodiments, the network controller identifies the various devices (both initiators 130 and targets 140) according to a device configuration 150 provided by an administrative user or compiled/updated according to reports from the individual devices that identifies the networked name and associated IP address for each such device, as well as the storage capabilities of the target 140 devices.

At block 320, the network controller groups the devices identified per block 310 into various endpoint groups according to an endpoint group configuration 160. The network controller groups the identified targets 140 into various target groups 220 defined in the endpoint group configuration 160. The network controller can define a plurality of target groups 220 that each include one or more targets 140, in which a given target 140 is assigned to a single target group 220. Similarly, the network controller groups the identified initiators 130 into various initiator groups 210 defined in the endpoint group configuration 160. The network controller can define a plurality of initiator groups 210 that each include one or more initiators 130, in which a given initiator 130 is assigned to a single initiator group 210.

Once the network controller identifies which endpoint devices belong to the respective endpoint groups, a discovery service 114 hosted by the network controller (or a separate device) can distribute and update the addressing information (including IP addresses and/or networked name of the respective targets 140) to the various initiators 130 to store data to or retrieve data from targets 140 that the security policy configuration 170 permits the given initiator 130 and the associated initiator group 210 to access. The distribution and updating of the addressing information is provided dynamically, without an administrative user having to manually provide such information to the individual initiators 130, and in a tailored set of transmissions so that only the requesting or affected initiators 130 are sent the updates. Accordingly, the network can grow to greater scale with endpoints connecting to and disconnection from the network while maintaining appropriate security rules for access to networked storage devices.

At block 330, the discovery service 114 determines whether a discovery request has been received from an initiator 130. In response to receiving a discovery request from an initiator 130, method 300 proceeds to block 340. Otherwise, method 300 proceeds to block 350.

At block 340, in response to receiving a discovery request from a given initiator 130, the discovery service 114 returns addressing information for the targets 140 that belong to the target groups 220 associated with the initiator group 210 that the given initiator 130 belongs to according to the security policy configuration 170. Depending on the number of target groups 220 with which the requesting initiator 130 (and the initiator group 210 thereof) is associated with, the discovery service 114 may return no addressing information (if the initiator group 210 is not associated with a target group 220), or may return the addressing information for the members of one or more target groups 220. Method 300 may then return to block 330 to continue monitoring for discovery requests, updates to the endpoint group configuration 160, and/or updates to the security policy configuration 170.

At block 350, the network controller determines whether an update to membership of the plurality of target groups 220 has occurred. For example, updates to the membership of a target group can include instances when a new memory storage device has been added to a target group 220, removed from a target group 220, switched from a first target group 220a to a second target group 220b, updated with a new configuration (e.g., the number of volumes available for storage has changed), or the like. In various embodiments, the update to the membership of the target groups 220 is provided in a new endpoint group configuration 160 or a change log for an endpoint group configuration 160. In response to identifying an update to membership of the plurality of target groups 220, method 300 proceeds to block 370. Otherwise, method 300 proceeds to block 360.

At block 360, the network controller determines whether an update to the security policy configuration 170 has been received. For example, updates to the security policy configuration 170 can include instances when a new initiator group 210 is identified for granting access to a given target group 220 or existing access to a given target group 220 is removed for a given initiator group 210. In various embodiments, the update to the security policy configuration 170 is provided in a security policy configuration 170 or a change log for a security policy configuration 170. In response to identifying an update to the security policy configuration 170, method 300 proceeds to block 370. Otherwise, method 300 returns to block 330 to continue monitoring for discovery requests, updates to the endpoint group configuration 160, and/or updates to the security policy configuration 170.

At block 370, the network controller pushes changes over the SDN to the affected initiator groups 210 (and not to the unaffected initiator groups 210) that are identified as being one or more of associated with target group 220 with updated membership (per block 350) and associated with an updated security policy configuration 170 (per block 360). The affected initiator groups 210 include those endpoint groups that have a different set of targets 140 that the initiators 130 thereof are permitted to access compared to before the update. The updated addressing information can replace previous provided sets of addressing information so that the members of the affected initiator groups 210 can access the targets 140 in any newly permitted target groups 220, and no longer access targets 140 in any newly forbidden target groups. Method 300 may then return to block 330 to continue monitoring for discovery requests, updates to the endpoint group configuration 160, and/or updates to the security policy configuration 170.

Figure 4:
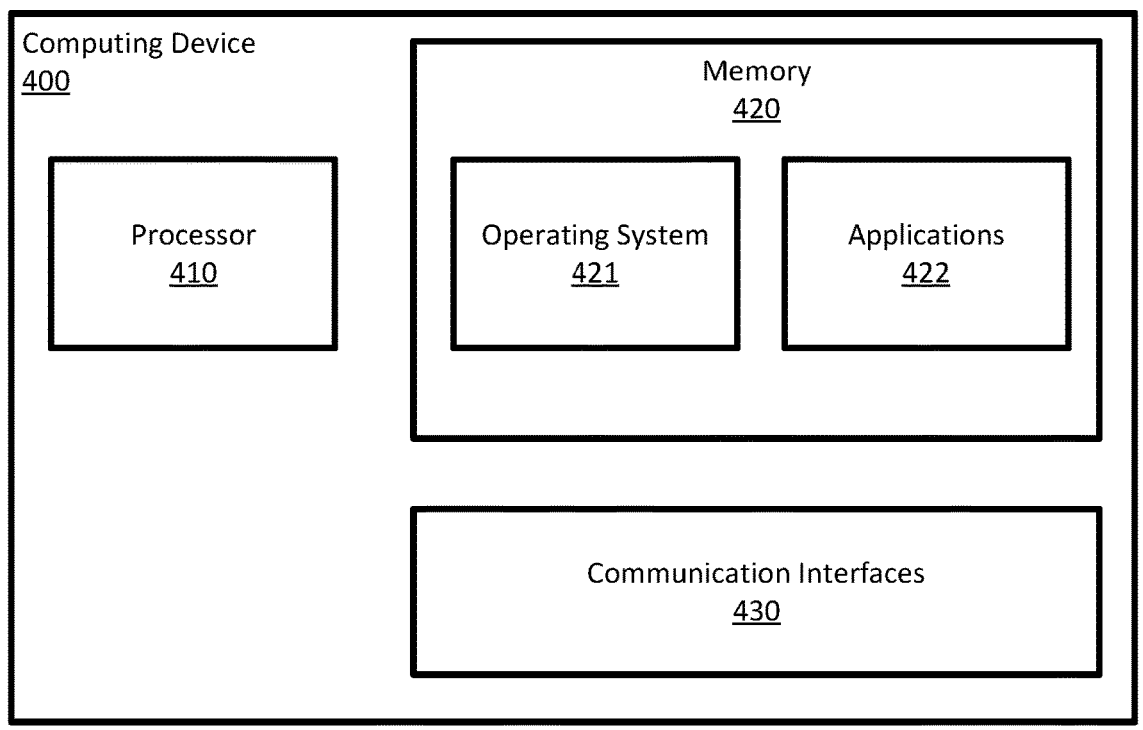
FIG. 4 illustrates hardware of a computing device, according to embodiments of the disclosure.

FIG. 4 illustrates hardware of a computing device 400, as may be used in as an SDN controller 110, an initiator 130, or a target 140 in various embodiments. The computing device 400 includes a processor 410, a memory 420, and communication interfaces 430. The processor 410 may be any processing element capable of performing the functions described herein. The processor 410 represents a single processor, multiple processors, a processor with multiple cores, and combinations thereof. The communication interfaces 430 facilitate communications between the computing device 400 and other devices. The communications interfaces 430 are representative of wireless communications antennas and various wired communication ports. The memory 420 may be either volatile or non-volatile memory and may include RAM, flash, cache, disk drives, and other computer readable memory storage devices. Although shown as a single entity, the memory 420 may be divided into different memory storage elements such as RAM and one or more hard disk drives.

As shown, the memory 420 includes various instructions that are executable by the processor 410 to provide an operating system 421 to manage various functions of the computing device 400 and one or more applications 422 to provide various functionalities to users of the computing device 400, which include one or more of the functions and functionalities described in the present disclosure. When provided as part of a target 140, the memory 420 may be addressable in various volumes over a network according to a networked memory standard, such as, for example, NVMe-oF.

Figure 5:
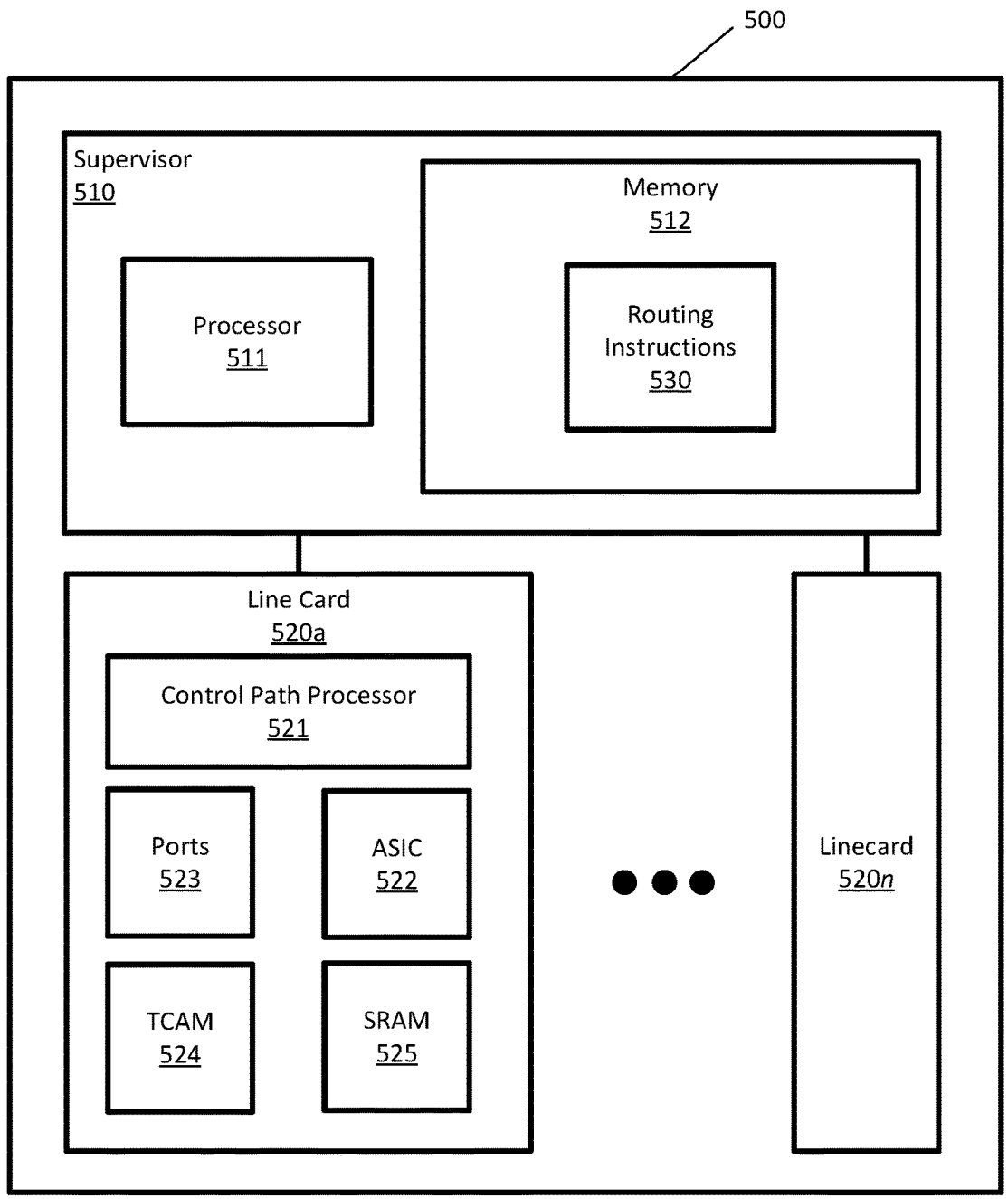
FIG. 5 illustrates hardware of a network switch, according to embodiments of the present disclosure.

FIG. 5 illustrates hardware of a network switch 500, as may be used to host an SDN controller 110 and/or direct traffic over an SDN 120 according to embodiments of the present disclosure. The network switch 500 includes a supervisor module 510 and a plurality of linecards 520a-n. The supervisor module 510 includes a processor 511 and memory 512. The memory 512 stores software instructions that are executed by the processor 511. In particular, the memory 512 may store various security policies, class IDs, and modules or applications according to the present disclosure so as to provide zero trust dynamic discovery for routing information.

Each linecard 520 includes a control path processor 521, an Application Specific Integrated Circuit (ASIC) 522, a plurality of ports/interfaces 523 coupled to the ASIC 522, a Ternary Content-Addressable Memory (TCAM) 524, and a Static Random Access Memory (SRAM) 525. The control path processor 521 is a CPU/processor that receives configuration commands from the supervisor module 510 to program the TCAM 524 and SRAM 525. The ASIC 522 is a hardware device that directs an incoming packet at a port/interface 523 to a particular other port/interface on another device based on the content of the TCAM 524 and SRAM 525. The ASIC 522 may buffer received packets in the TCAM/SRAM for delayed transmission to the other device. There may be multiple TCAM/SRAM pairs in a linecard 520.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving a discovery request from a first initiator endpoint;
   selecting an associated target endpoint group for the first initiator endpoint from a plurality of target endpoint groups using a security policy configuration; and
   providing addressing information for the associated target endpoint group to the first initiator endpoint.

2. The method of claim 1, further comprising:
   identifying a plurality of endpoints, including targets and initiators, connected to a software defined network, wherein the targets are provided on the software defined network according to a network addressable memory standard that lacks a native discovery service;
   grouping the targets into the plurality of target endpoint groups and the initiators into a plurality of initiator endpoint groups; and
   providing the addressing information by returning the addressing information for the associated target endpoint group, wherein the first initiator endpoint is grouped in a first initiator endpoint group of the plurality of initiator endpoint groups, wherein the associated target endpoint group is one of the plurality of target endpoint groups associated with the first initiator endpoint group in the security policy configuration, and wherein the security policy configuration is associated with the software defined network.

3. The method of claim 2, wherein the targets are networked storage devices.

4. The method of claim 3, wherein the network addressable memory standard used by the software defined network to provide the networked storage devices is NVMe-oF (Non-Volatile Memory Express over Fabrics) via TCP (Transmission Control Protocol).

5. The method of claim 3, wherein the network addressable memory standard used by the software defined network to provide the networked storage devices is NVMe-oF (Non-Volatile Memory Express over Fabrics) via RoCE (RDMA (Remote Direct Memory Access) over Converged Ethernet).

6. The method of claim 1, further comprising, in response to receiving an update to membership of the plurality of target endpoint groups:
pushing changes to the first initiator endpoint, wherein the first initiator endpoint is identified as being associated with a given target group of the plurality of target endpoint groups with updated membership.

7. The method of claim 1, further comprising, in response to receiving an update to the security policy configuration:
pushing changes to the first initiator endpoint, wherein the first initiator endpoint is identified as being associated with a different set of target endpoint groups after the update than before the update.

8. The method of claim 1, wherein the security policy configuration associates a given initiator group comprising the first initiator endpoint to more than one target endpoint group of the plurality of target endpoint groups, the method further comprising:
returning, to the first initiator endpoint, addressing information for a second target endpoint group of the plurality of target endpoint groups associated with a given initiator group in the security policy configuration for a software defined network.

9. A system, comprising:
a processor; and
a memory including instructions that when executed by the processor performs an operation comprising:
receiving a discovery request from a first initiator endpoint;
selecting an associated target endpoint group for the first initiator endpoint from a plurality of target endpoint groups using a security policy configuration; and
providing addressing information for the associated target endpoint group to the first initiator endpoint.

10. The system of claim 9, wherein the operation further comprises:
identifying a plurality of endpoints, including targets and initiators, connected to a software defined network, wherein the targets are provided on the software defined network according to a network addressable memory standard that lacks a native discovery service;
grouping the targets into the plurality of target endpoint groups and the initiators into a plurality of initiator endpoint groups; and
providing the addressing information by returning the addressing information for the associated target endpoint group, wherein the first initiator endpoint is grouped in a first initiator endpoint group of the plurality of initiator endpoint groups, wherein the associated target endpoint group is one of the plurality of target endpoint groups associated with the first initiator endpoint group in the security policy configuration, and wherein the security policy configuration is associated with the software defined network.

11. The system of claim 10, wherein the targets are networked storage devices, and wherein the network addressable memory standard used by the software defined network to provide the networked storage devices is selected from one of:
NVMe-oF (Non-Volatile Memory Express over Fabrics) via TCP (Transmission Control Protocol), and
NVMe-oF via RoCE (RDMA (Remote Direct Memory Access) over Converged Ethernet).

12. The system of claim 9, wherein the operation further comprises, in response to receiving an update to membership of the plurality of target endpoint groups:
pushing changes to the first initiator endpoint, wherein the first initiator endpoint is identified as being associated with a given target group of the plurality of target endpoint groups with updated membership.

13. The system of claim 9, wherein the operation further comprises, in response to receiving an update to the security policy configuration:
pushing changes to the first initiator endpoint, wherein the first initiator endpoint is identified as being associated with a different set of target endpoint groups after the update than before the update.

14. The system of claim 9, wherein the security policy configuration associates a given initiator group comprising the first initiator endpoint to more than one target endpoint group of the plurality of target endpoint groups, and wherein the operation further comprises:
returning, to the first initiator endpoint, addressing information for a second target endpoint group of the plurality of target endpoint groups associated with a given initiator group in the security policy configuration for a software defined network.

15. A storage device including computer readable instructions that when executed by a processor enable performance of an operation comprising:
receiving a discovery request from a first initiator endpoint;
selecting an associated target endpoint group for the first initiator endpoint from a plurality of target endpoint groups using a security policy configuration; and
providing addressing information for the associated target endpoint group to the first initiator endpoint.

16. The storage device of claim 15, wherein the operation further comprises:
identifying a plurality of endpoints, including targets and initiators, connected to a software defined network, wherein the targets are provided on the software defined network according to a network addressable memory standard that lacks a native discovery service;
grouping the targets into the plurality of target endpoint groups and the initiators into a plurality of initiator endpoint groups; and
providing the addressing information by returning the addressing information for the associated target endpoint group, wherein the first initiator endpoint is grouped in a first initiator endpoint group of the plurality of initiator endpoint groups, wherein the associated target endpoint group is one of the plurality of target endpoint groups associated with the first initiator endpoint group in the security policy configuration, and wherein the security policy configuration is associated with the software defined network.

17. The storage device of claim 16, wherein the targets are networked storage devices, and wherein the network addressable memory standard used by the software defined network to provide the networked storage devices is selected from one of:
NVMe-oF (Non-Volatile Memory Express over Fabrics) via TCP (Transmission Control Protocol), and
NVMe-oF via RoCE (RDMA (Remote Direct Memory Access) over Converged Ethernet).

18. The storage device of claim 15, wherein the operation further comprises, in response to receiving an update to membership of the plurality of target endpoint groups:
    pushing changes to the first initiator endpoint, wherein the first initiator endpoint is identified as being associated with a given target group of the plurality of target endpoint groups with updated membership.

19. The storage device of claim 15, wherein the operation further comprises, in response to receiving an update to the security policy configuration:
    pushing changes to the first initiator endpoint, wherein the first initiator endpoint is identified as being associated with a different set of target endpoint groups after the update than before the update.

20. The storage device of claim 15, wherein the security policy configuration associates a given initiator group comprising the first initiator endpoint to more than one target endpoint group of the plurality of target endpoint groups, and wherein the operation further comprises:
    returning, to the first initiator endpoint, addressing information for a second target endpoint group of the plurality of target endpoint groups associated with a given initiator group in the security policy configuration for a software defined network.

\* \* \* \* \*